(12) United States Patent
Fry et al.

(10) Patent No.: US 11,616,793 B2
(45) Date of Patent: Mar. 28, 2023

(54) SYSTEM AND METHOD FOR DEVICE CONTEXT AND DEVICE SECURITY

(71) Applicant: Minim Inc., Manchester, NH (US)

(72) Inventors: Peter Fry, Peterborough, NH (US); Jeremy Hitchcock, Manchester, NH (US); Jonathan T. Rajewski, South Burlington, VT (US); Alec Rooney, Eliot, ME (US)

(73) Assignee: Minim Inc., Manchester, NH (US)

( * ) Notice: Subject to any disclaimer, the term of this patent is extended or adjusted under 35 U.S.C. 154(b) by 357 days.

(21) Appl. No.: 16/237,946

(22) Filed: Jan. 2, 2019

(65) Prior Publication Data
US 2019/0306182 A1    Oct. 3, 2019

Related U.S. Application Data

(60) Provisional application No. 62/649,025, filed on Mar. 28, 2018.

(51) Int. Cl.
*H04L 9/40*      (2022.01)
*H04L 67/12*     (2022.01)
*H04L 41/046*    (2022.01)
*G06F 16/22*     (2019.01)

(52) U.S. Cl.
CPC ........ *H04L 63/1425* (2013.01); *H04L 41/046* (2013.01); *H04L 63/1416* (2013.01); *H04L 67/12* (2013.01); *G06F 16/22* (2019.01)

(58) Field of Classification Search
CPC . H04L 63/1425; H04L 63/14; H04L 63/1408; H04L 63/1416; H04L 29/06877; H04L 29/06884; H04L 29/06891; H04L 29/06897
See application file for complete search history.

(56) References Cited

U.S. PATENT DOCUMENTS

| | | | |
|---|---|---|---|
| 2014/0068030 A1* | 3/2014 | Chambers | H04L 41/0809 709/220 |
| 2014/0283061 A1* | 9/2014 | Quinlan | H04L 63/1441 726/23 |
| 2015/0312103 A1* | 10/2015 | Arose | H04L 41/12 370/255 |
| 2016/0261465 A1* | 9/2016 | Gupta | H04L 43/04 |
| 2017/0289184 A1* | 10/2017 | C | H04L 67/12 |
| 2018/0144139 A1* | 5/2018 | Cheng | G06F 21/577 |
| 2019/0222594 A1* | 7/2019 | Davis, III | H04L 41/0816 |
| 2019/0306731 A1* | 10/2019 | Raghuramu | H04W 48/16 |
| 2020/0076799 A1* | 3/2020 | Lackey | H04L 63/1425 |

* cited by examiner

*Primary Examiner* — Esther B. Henderson
(74) *Attorney, Agent, or Firm* — Sheehan Phinney Bass & Green PA (57) ABSTRACT

A system includes local area network (LAN) devices in communication with network devices external to the LAN. An agent in the LAN examines traffic between LAN devices and external devices. The agent executes scans of the LAN devices, generates fingerprint and telemetry data for the LAN devices, and sends the telemetry data and the fingerprint data to a cloud server external to the LAN. The cloud server receives telemetry data and fingerprint data and updates a device attribute database with fingerprints and/or device profiles for the LAN devices to identify anomalous behavior of the LAN devices.

14 Claims, 7 Drawing Sheets

SYSTEM AND METHOD FOR DEVICE CONTEXT AND DEVICE SECURITY

FIELD OF THE INVENTION

The present invention relates to communication networks, and more particularly, is related to monitoring network security.

BACKGROUND OF THE INVENTION

Internet capable devices and appliances are becoming more common in the home. In particular, internet of things (IoT) devices tend to have limited processing and storage capacities, and may therefore have limited internal security features. Any single device may be compromised and/or attacked via a number of vectors on the home network (local area network (LAN)) and the wide area network (WAN) that the home network connects with. Various methods have been used to prevent and mitigate these network based attacks on all these varied types of devices.

The most common way to protect a home network today is a network address translation (NAT) based firewall, for example, on a home network router, where devices within the LAN can communicate with the outside world (for example, via the WAN) but the outside world cannot initiate communication with devices in the LAN. Other techniques include blocking traffic to specific destinations based on a blacklist enforcing Domain Name System (DNS) based and/or internet protocol (IP) based rules. Some firewalls use deep packet inspection (DPI) to try to detect malicious traffic which involves looking at the contents of some traffic to determine if it is suspicious. However, NAT firewalls only block connections entering the LAN. It is possible to circumvent them by tricking a device or a person inside the LAN to connect to a malicious site outside the LAN and then infect devices inside the LAN via that outgoing connection.

Another common technique is to use antivirus software on some of the devices on the home network to protect those devices from infection. There are also device specific firewalls such as Little Snitch which earmarks suspicious traffic and prompts the user to determine if traffic is to be blocked. However, antivirus solutions and device specific firewalls generally only address personal computers, and may not be feasible on IoT devices. This technology is often "signature based," looking for previously identified threats and does not identify unique/new threats. Many devices on a home LAN today are not personal computers. Also, the high frequency of application based warning prompts may desensitize users who may respond by clicking an "allow" box to dismiss the annoying prompts, thus allowing malicious traffic.

Deep Packet Inspection (DPI) involves visibility into the contents of packets as they travel through a network. As companies continue to increase their security to industry standards (using SSL and HTTPS encrypted traffic) DPI is generally not possible without installing special certificates on the devices within the LAN so that the traffic may be decrypted. This process may pose a risk because it effectively breaks the security trust system designed by companies and is not possible on most IoT devices as their core operating system functions may be protected by the vendor. Therefore, there is a need in the industry to address one or more of these issues.

SUMMARY OF THE INVENTION

Embodiments of the present invention provide a system and method for device context and device security. Briefly described, the present invention is directed to a system includes local area network (LAN) devices in communication with network devices external to the LAN. An agent in the LAN examines traffic between LAN devices and external devices. The agent executes scans of the LAN devices, generates fingerprint and telemetry data for the LAN devices, and sends the telemetry data and the fingerprint data to a cloud server external to the LAN. The cloud server receives telemetry data and fingerprint data and updates a device attribute database with fingerprints and/or device profiles for the LAN devices to identify anomalous behavior of the LAN devices. The device attribute database includes the manufacturer, model, and type of each device on the LAN and the way each behaves.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

The following definitions are useful for interpreting terms applied to features of the embodiments disclosed herein, and are meant only to define elements within the disclosure. No limitations on terms used within the claims are intended, or should be derived, thereby. Terms used within the appended claims should only be limited by their customary meaning within the applicable arts.

As used within this disclosure, "telemetry" refers to a remote network data monitoring capability. The process used to monitor and/or collect the network data may change depending upon the type of data being monitored. Telemetry is generally an automated communications process by which measurements and other data are collected at remote or difficult to access points and transmitted to receiving equipment for monitoring.

As used within this disclosure, "local" refers to a network entity addressable within a LAN, while "remote" refers to a network entity having a network address outside the LAN.

As used within this disclosure, a "fingerprint" or "signature" refers to a pattern of activity and/or content in network traffic created by a particular monitored device. The fingerprint may be detected, for example, via telemetry, that may be used to identify a device and/or class of devices, indicating specific characteristics of a monitored device and/or behavior of the device. The fingerprinting process may include examining a plurality of facets, where each facet includes one or more device attributes, for example, indicating an identifying aspect of the device itself (such as a network address or hardware identifier such as a media access control (MAC) address). Furthermore, a fingerprint may include a pattern of traffic and/or traffic content that allows the embodiments to infer expected behavior for devices. For example, facets may be used to identify a type or classification of device, where a fingerprint may be used to distinguish two different devices that share one or more facets.

As used within this disclosure, "periodicity" refers to a measure of how often a network enabled device traffic to a particular destination. Periodicity may also measure the amount of traffic sent to the destination.

Reference will now be made in detail to embodiments of the present invention, examples of which are illustrated in the accompanying drawings. Wherever possible, the same reference numbers are used in the drawings and the description to refer to the same or like parts.

As noted in the background section, existing network based solutions generally are not capable of identifying vulnerable IoT devices and/or other network devices. For example, existing network based solutions may fail to profile network traffic and identify make/model/OS/firmware versions of IoT devices, which limits the ability of the network based solutions to detect vulnerabilities. This also inhibits the ability of the network based solutions to detect and protect against attacks.

Figure 1A:
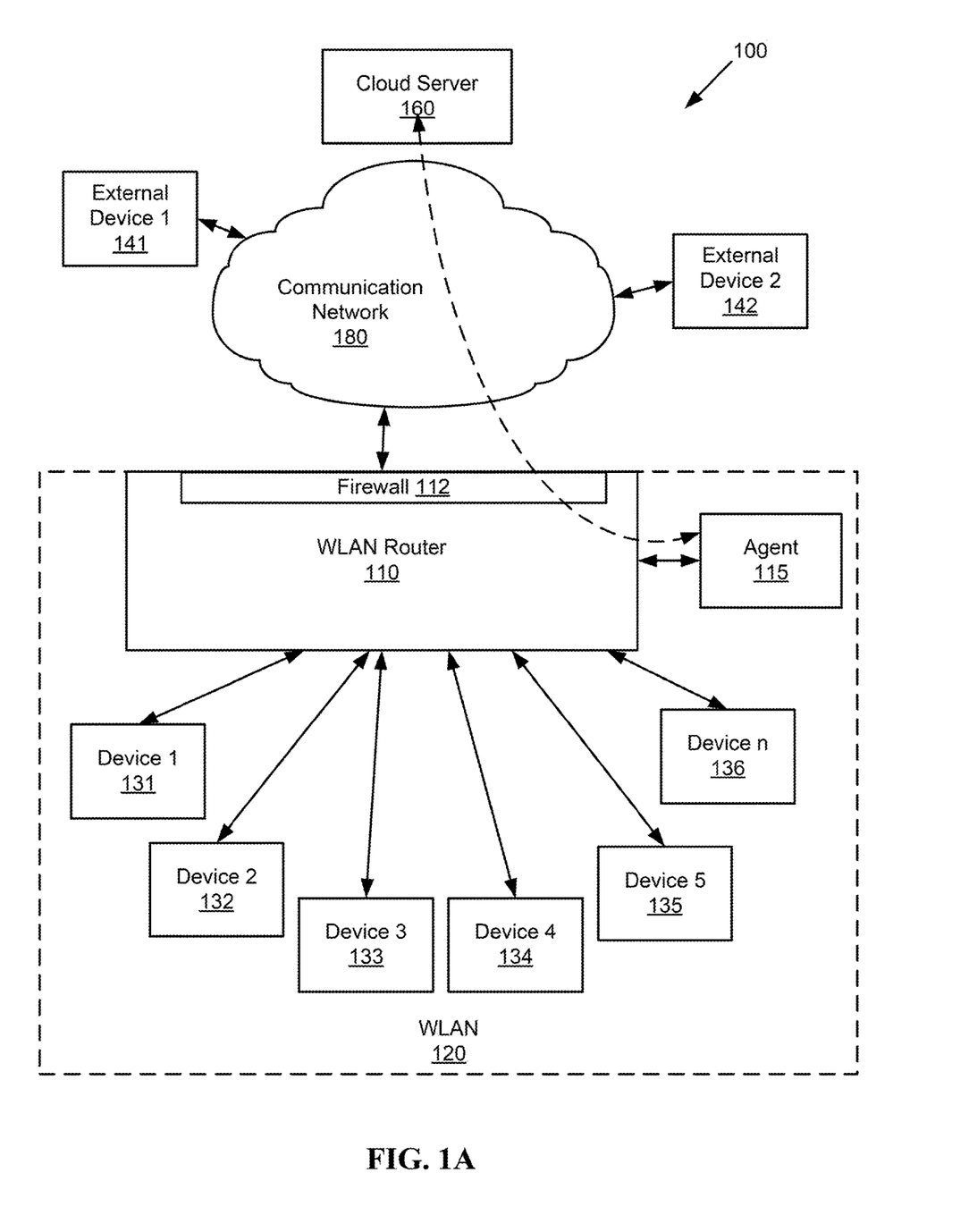
FIG. 1A is a schematic diagram of a first embodiment of a system for the present invention.

FIG. 1A is a schematic diagram of an exemplary first embodiment system 100 for the present invention. A wireless local area network (WLAN) router 110, for example, a data packet router, provides a WLAN 120 and exchanges data packets with n devices 131-136 communicating via the WLAN 120. While FIG. 1A shows a WLAN 120, the embodiment is not restricted to a wireless local area network (LAN), and may also apply to a wired LAN or a combination wired and wireless LAN.

An agent 115 may be an external network enabled device having a processor, a memory, and a network interface. Under the first embodiment, the agent 115 is in communication with the WLAN router, while under a second embodiment (shown in FIG. 1B), the agent 115 may be hosted by the WLAN router. The agent 115 provides telemetry services to monitor traffic via the WLAN router 110 to/from each of the devices 131-136. The agent 115 is configurable to examine certain types of packets, for example, DHCP packets, DNS packets, SSD packets, and MDNS packets, among other packet types. The agent 115 may also be configured to examine specific packet streams, for example, every packet stream which is defined by all packets sent to a particular destination IP address over some period of time, for example, 30 seconds. Here, the agent 115 records the source and destination IP addresses, the source MAC address, the corresponding DNS name of the destination, the IP protocol, the number of packets sent, the number of bytes sent, and the duration of the stream, for example, 30 seconds or less. This is typically referred to as netflow data.

The WLAN router 110 provides a communication conduit where the devices 131-136 may communicate with the other devices 131-136 within the WLAN 120, and or with devices external to the WLAN 120, for example external devices 141, 142 in communication with the communication network 180. The communication network 180 may be, for example, the internet or a wide area network (WAN).

The agent 115 communicates with a server, for example, a cloud server 160, via the WLAN router 110. The agent 115 provides telemetry information regarding traffic to and/or from the devices 131 to the cloud server 160 so that the cloud server 160 may determine characteristics and/or the specific identity of one or more of the devices 131-136. The telemetry information gathered by the agent 115 may be used to configure a firewall 112 of the WLAN router 110, and/or an external firewall (not shown) elsewhere in the WLAN 120. While the first embodiment shows a wireless LAN 120, alternative embodiments may instead have a wired LAN, or a combination of wireless and wired LANs.

As described further below, the agent 115 and/or the cloud server 160 may be configured to provide device identification and/or fingerprinting of devices 131-136 based on traffic forwarded by the WLAN router 110, for example, providing a device profile identifier for one or more of the network devices 131-136 including a hardware make/model, operating system (version number), classification of network traffic, and/or applications run by the device. The agent 115, cloud server 160 and device ID, may be leveraged to detect physical layer, network layer, and application layer issues. This feature set may provide network operators insight into the WLAN 120. Once one or more of the network devices 131-136 has been identified and/or profiled, the firewall 112 may be configured to block specific traffic to/from one or more of the devices 131-136. Similarly, the agent 115 may be configured to perform network security scans to prevent/detect threats, for example, but not limited to network traffic analysis, network segmentation, quality of service network prioritization, and network threat detection.

Figure 1B:
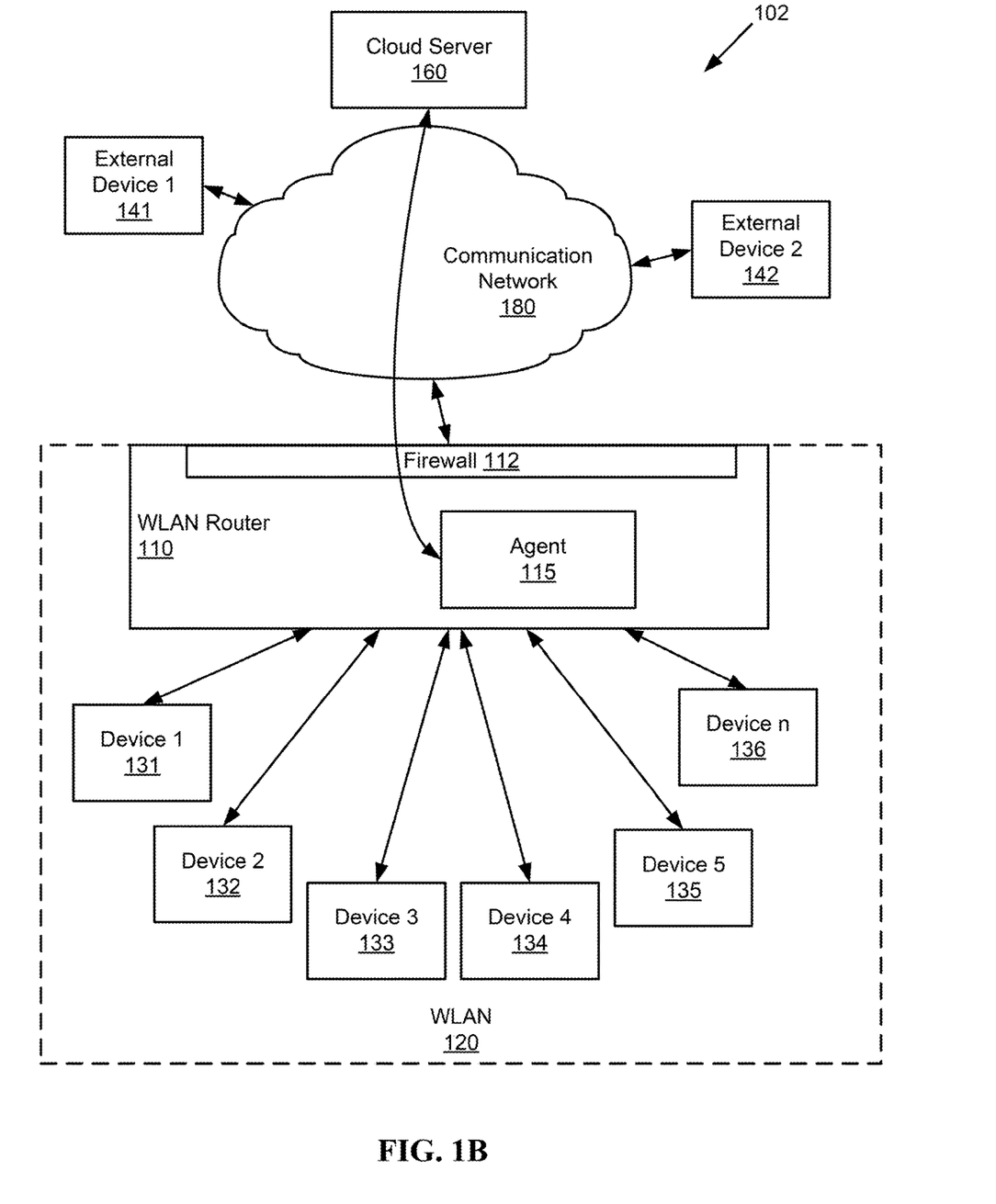
FIG. 1B is a schematic diagram of a second embodiment of a system for the present invention.

FIG. 1B is a schematic diagram of an exemplary second embodiment system 102 of the present invention, where the agent 115 is implemented within the WLAN router 110, for example, as a hardware and/or software module within the WLAN router.

Figure 2:
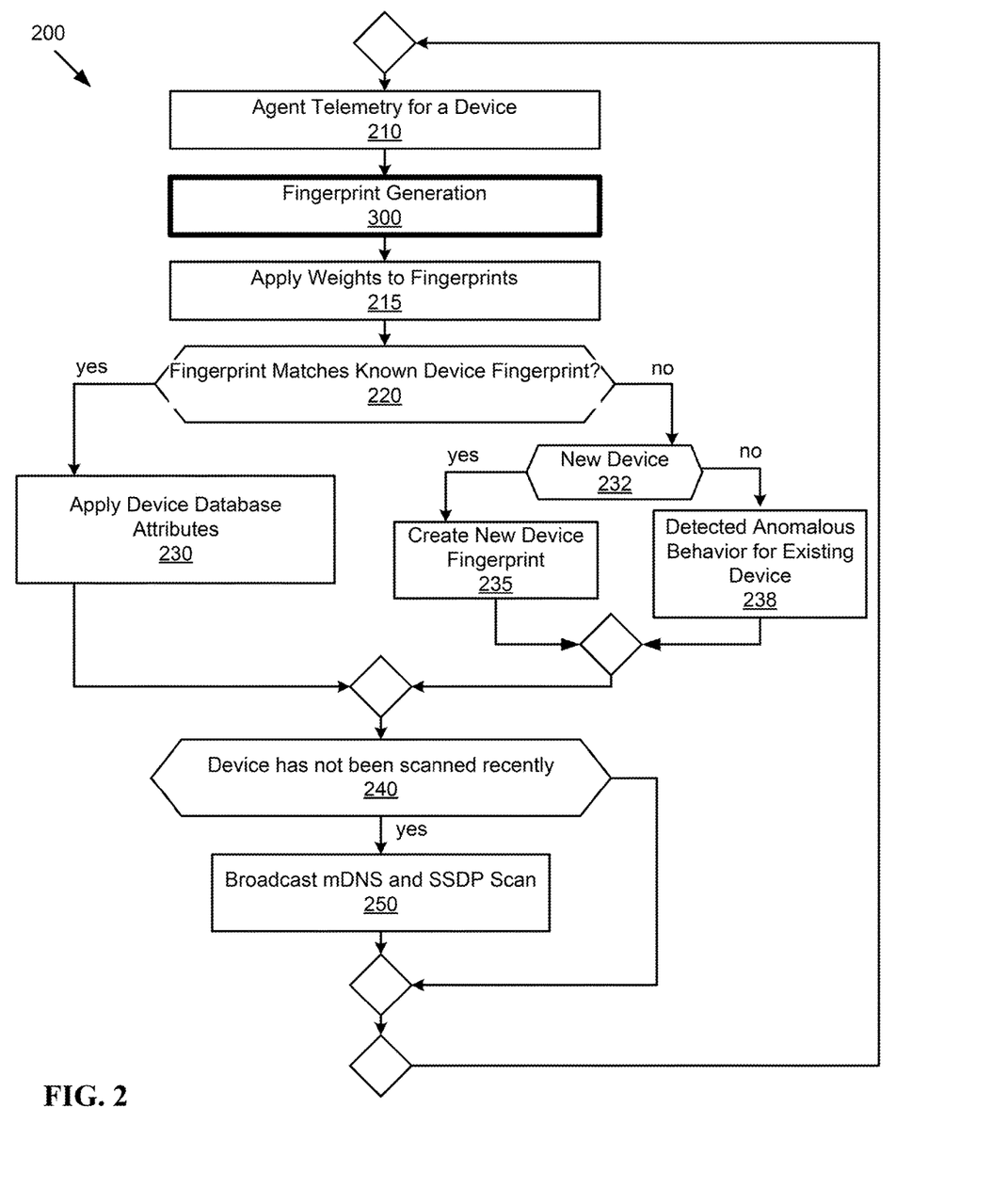
FIG. 2 is a flowchart for an exemplary method embodiment for implementing the functionality of the agent and/or the cloud server of FIGS. 1A and 1B.

FIG. 2 is a flowchart 200 for an exemplary method embodiment for implementing the functionality of the agent 115 and/or the cloud server 160 of FIG. 1. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The description of the flowchart 200 references FIG. 1 and FIG. 5.

Figure 5:
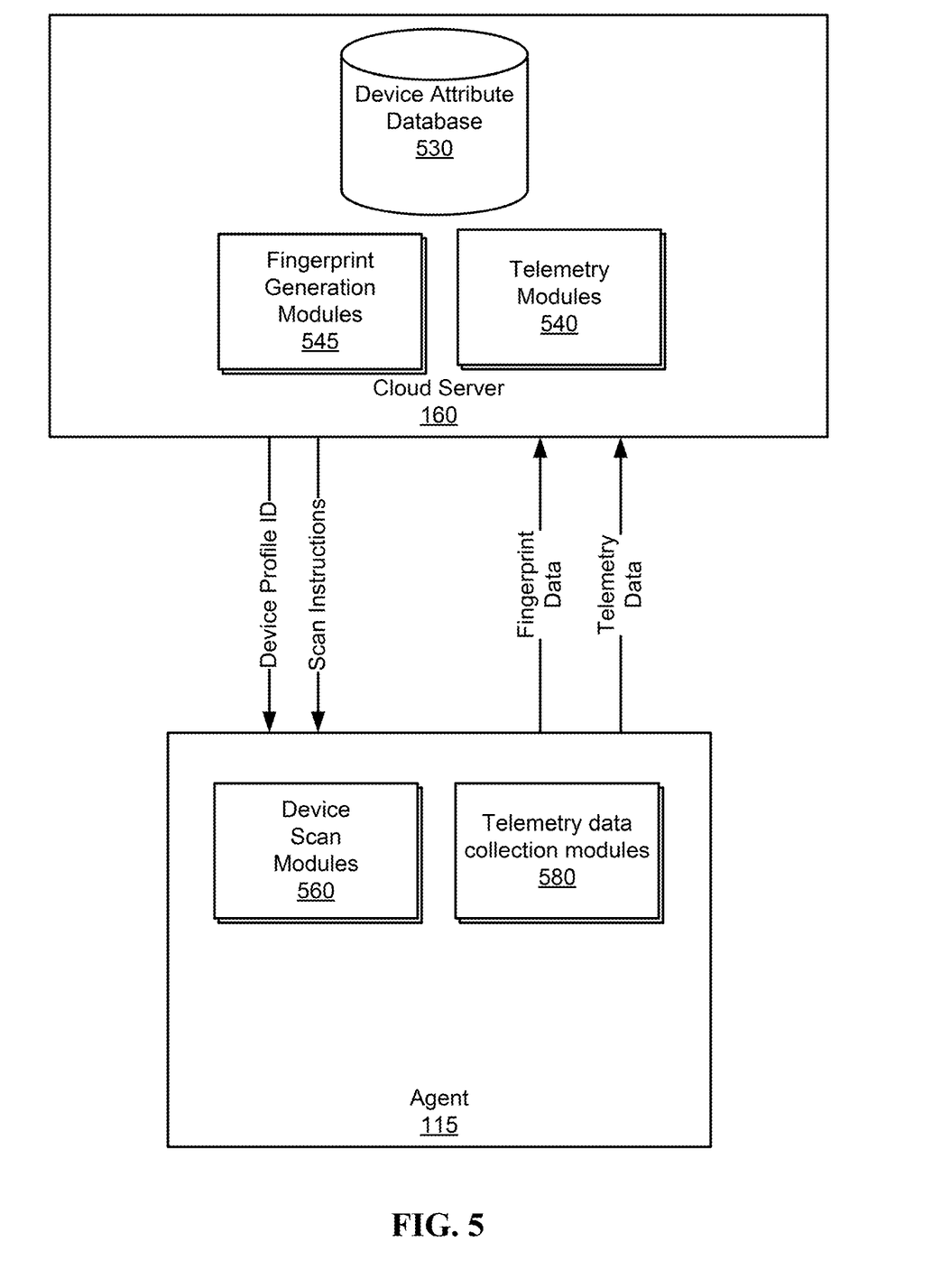
FIG. 5 is a schematic diagram detailing the cloud server and agent of FIGS. 1A and 1B.

The agent 115 collects the fingerprinting and/or telemetry data and forwards the fingerprinting and/or telemetry data to the cloud server 160. The cloud server 160 receive the fingerprinting and/or telemetry data from the agent 115 and launches a traffic analysis sub-process for a device 131-136 in the WLAN 120, as shown by block 210. Exemplary traffic analysis sub-processes may be implemented by one or more telemetry modules 540, 580 (FIG. 5), and are described in detail below regarding FIGS. 3A-3I, where each sub-process of FIGS. 3A-3I is used to isolate one or more facets for identifying a device in the network. A fingerprint generation sub-process may be implemented by one or more fingerprint generation modules 545 (FIG. 5) that interacts with the telemetry sub-process modules 540, 580 (FIG. 5) to generate a fingerprint, as shown in block 300 (see FIGS. 3A-3I).

A weight is applied to the fingerprint, as shown by block 215. A weight may indicate a degree of confidence in the strength and/or accuracy of the fingerprint. For example if the cloud server 160 receives SSDP data and DHCP data, the fingerprint generation module 545 may weight the fingerprint generated by the SSDP data more heavily than the DHCP data so if the DHCP data indicates the device is a Windows machine but the SSDP data indicates the device is Android the weighting will favor the interpretation that the device is an Android device because that is weighted more.

The fingerprint is compared to a plurality of known fingerprints in a device attribute database 530 (FIG. 5) to determine if the fingerprint matches a known device fingerprint, as shown by block 220. If the fingerprint matches a known device fingerprint, device database attributes are applied to the fingerprint, as shown by block 230 (see Table 1). The device attributes may include, for example, the manufacturer, model, and type of each device 131-136 and a corresponding behavior profile, among other possible device attributes.

If the fingerprint does not match a known device fingerprint, such as if the fingerprint is for a new device, as shown by block 232, a new device fingerprint is created, as shown by block 235. If the fingerprint is not for a new device, the cloud server 160 records that it has detected anomalous behavior for an existing device. For example, the cloud server 160 may flag the anomalous behavior to perform further tests to determine if the anomalous behavior is malicious. The agent 115 and/or the cloud server 160 checks to see if the device 131-136 targeted by the telemetry has been scanned recently, for example, by a network security scan, as shown by block 240. If the device 131-136 targeted by the telemetry has not been scanned recently, for example, within the last 24 hours, the agent 115 and/or the cloud server 160 broadcasts one or more scans of the WLAN devices 131-136 by executing a scan module 560 (FIG. 5) to execute, for example, a multicast DNS (mDNS) scan and/or an Open Simple Service Discovery Protocol (SSDP) scan, as shown by block 250.

The device database 530 may be located in the cloud server 160. The device database 530 may include fingerprints derived from network activity as well as external data that is both manually and automatically entered. Network activity may be used to fingerprint devices. Such network activity may be, for example, an Apple TV receiving 30 Mb of data from an Apple server over a period of 10 minutes. The agent 115 learns the network activity fingerprints by recording and analyzing the network behavior of new/unknown devices by executing one or more traffic analysis modules 575 (FIG. 5) as shown by block 235. After the cloud server 160 has created a fingerprint, the fingerprint may be updated, for example, via manual intervention to correlate the fingerprint with a specific manufacturer and model.

FIGS. 3A-3I depict several exemplary sub-processes of the fingerprint generation block 300 (FIG. 2). The agent 115 executes each sub-process to test for a specific type of device (facet), for example, by collecting a response to a protocol query (such as mDNS, SSDP, DHCP, among others) which may include analysis of the traffic content (packet payload). Per FIG. 3A, connection telemetry is reduced by a remote DNS, as shown by block 310. Periodicity is generated per DNS, as shown by block 320. The cloud server 160 receives telemetry data for a device 131-136 and analyzes the traffic rates and data amounts per address. For example, the cloud server 160 may record how often a device 131-136 sends and/or receives packets to/from nest.com. If the device exchanges traffic to and/or from nest.com every 23 hours, this represents a periodicity of 23 hours to nest.com. A periodicity fingerprint is generated, as shown by block 330.

Figure 3A:
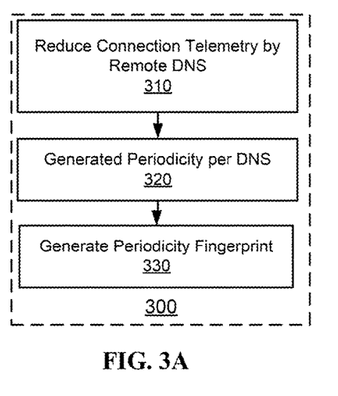
FIG. 3A is a flowchart illustrating a first sub-process of the fingerprint generation block of FIG. 2.
Figure 3B:
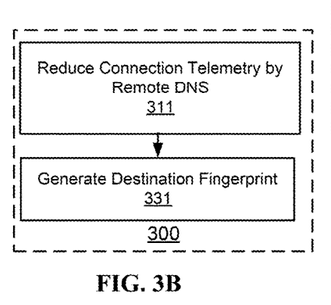
FIG. 3B is a flowchart illustrating a second sub-process of the fingerprint generation block of FIG. 2.

Per FIG. 3B, connection telemetry is reduced by remote DNS, as shown by block 311. A destination fingerprint is generated, as shown by block 331.

Figure 3C:
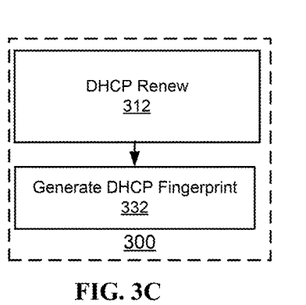
FIG. 3C is a flowchart illustrating a third sub-process of the fingerprint generation block of FIG. 2.

Per FIG. 3C, a DHCP renew negotiation is captured, as shown by block 312. A DHCP fingerprint is generated, as shown by block 330.

Figure 3D:
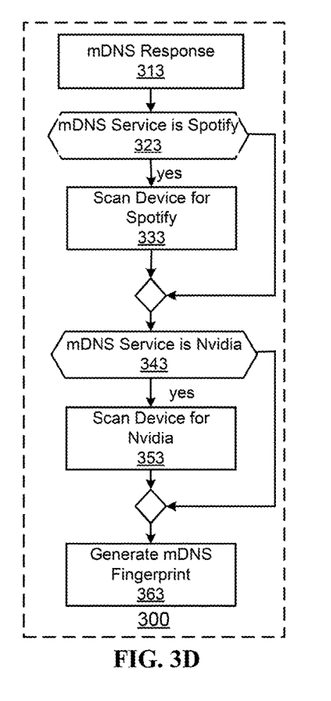
FIG. 3D is a flowchart illustrating a fourth sub-process of the fingerprint generation block of FIG. 2.

Per FIG. 3D, a response from the mDNS scan (see block 250 (FIG. 2)) is received, as shown by block 313. If the mDNS scan indicates that the mDNS service is Spotify, as shown by block 323, the device 131-136 is scanned to determine if the device hosts a Spotify application, as shown by block 333. If the mDNS scan indicates that the mDNS service is Nvidia, as shown by block 343, the device 131-136 is scanned for Nvidia, as shown by block 353. An mDNS fingerprint is generated, as shown by block 363.

Figure 3E:
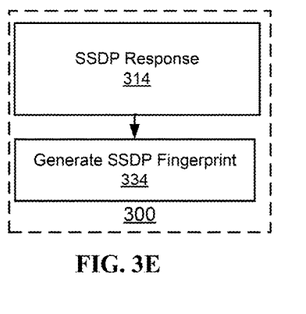
FIG. 3E is a flowchart illustrating a fifth sub-process of the fingerprint generation block of FIG. 2.

Per FIG. 3E, a response from the SSDP scan (see block 250 (FIG. 2)) is received, as shown by block 314. An SSDP fingerprint is generated, as shown by block 334.

Figure 3F:
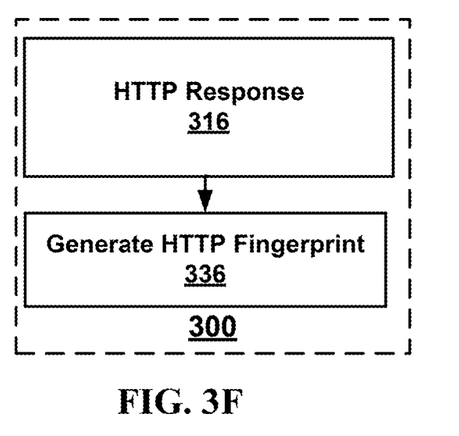
FIG. 3F is a flowchart illustrating a sixth sub-process of the fingerprint generation block of FIG. 2.

Per FIG. 3F, a response to an HTTP telemetry is received, as shown by block 316. An HTTP fingerprint is generated, as shown by block 336.

Figure 3G:
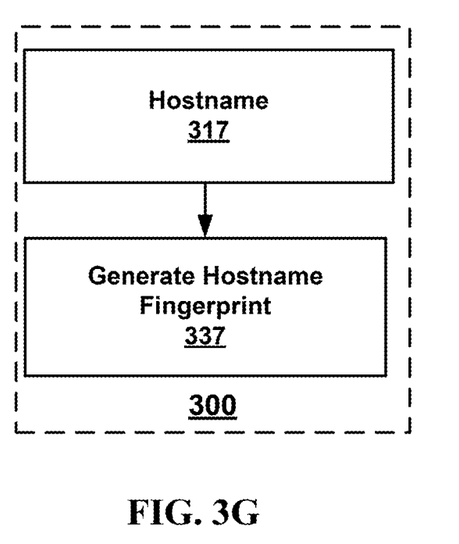
FIG. 3G is a flowchart illustrating a seventh sub-process of the fingerprint generation block of FIG. 2.

Per FIG. 3G, a response to a hostname telemetry is received, as shown by block 317. A hostname fingerprint is generated, as shown by block 337.

Figure 3H:
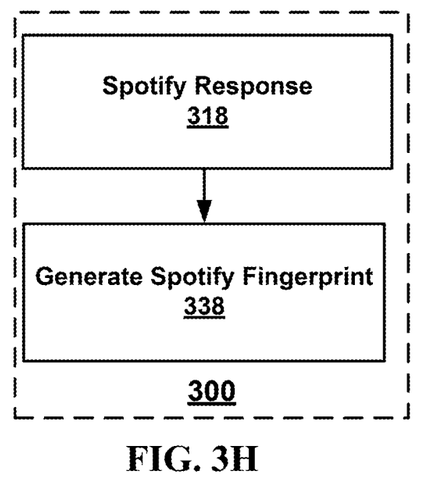
FIG. 3H is a flowchart illustrating an eighth sub-process of the fingerprint generation block of FIG. 2.

Per FIG. 3H, a response from the Spotify scan (see block 233 (FIG. 3D)) is received, as shown by block 318. A Spotify fingerprint is generated, as shown by block 338.

Figure 3I:
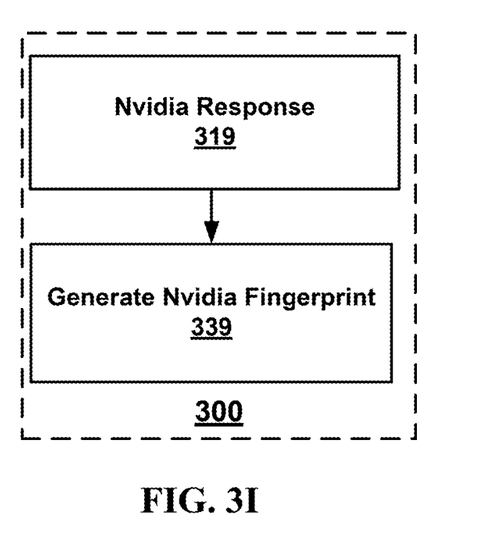
FIG. 3I is a flowchart illustrating a ninth sub-process of the fingerprint generation block of FIG. 2.

Per FIG. 3I, a response from the nVidia scan (see block 253 (FIG. 3D)) is received, as shown by block 319. An nVidia fingerprint is generated, as shown by block 339.

Each of the "Generate XXX fingerprint" blocks may generate a fingerprint by analyzing the traffic to associate a traffic pattern with a specific device, where XXX is periodicity (330), destination (331), DHCP (332), mDNS (363), SSDP (334), HTTP (336), hostname (337), Spotify (338), and nVidia (339).

Table 1 provides examples of each of the fingerprints described above. While FIGS. 3A-3I detail several exemplary sub-processes of the fingerprint generation block 300 (FIG. 2), other sub-processes are also possible.

TABLE 1

Examples of fingerprints

| Type | Match Data | Product | Product Type | IoT Database Attributes |
|---|---|---|---|---|
| mDNS | Ipps:usb_MDL: officejet 5740 series | HP Officejet 5740 series | Printer | Has screen/ethernet/802.11 b/g/n |
| SSDP | Sonos PLAY:5 | Sonos PLAY:5 | Music | Has speaker/ethernet 802.11 b/g |
| DHCP | 1 121 3 6 15 119 252 95 44 46 | MacOS | Operating System | — |
| Hostname | Apple & /\A.*pad.*\z/ | Apple iPad | Mobile device | Mobile/802.11 |
| Periodicity | Amazon & pindorama.amazon.com every 60 minutes | Amazon Echo | Smart Speaker | Has microphone/speaker/ethernet/802.11 a/b/g/n |
| Spotify | Ps4 | Sony Playstation 4 | Entertainment | Has bluetooth/ethernet/802.11 a/b/g/n/ac |
| Traffic | Nest Labs & DNS of dropcam | Nest Cam Indoor | Security camera | Has camera/microphone/speaker/802.11 a/b/g/n |
| nVidia | GeForce GTX 970M | nVidia GeForce GTX 970M | Pc video card | Supports Display Port and HDMI |

Based on the fingerprints and device profiles described above, the agent 115 can be configured to monitor traffic in the WLAN 120 and determine if the monitored traffic constitutes expected behavior for each device 131-136, for example, based on traffic attributes such as the content, sender/receiver address and/or port, correlation to a DNS server, cumulative volume of traffic, and packet sizes, among other attributes.

Figure 4:
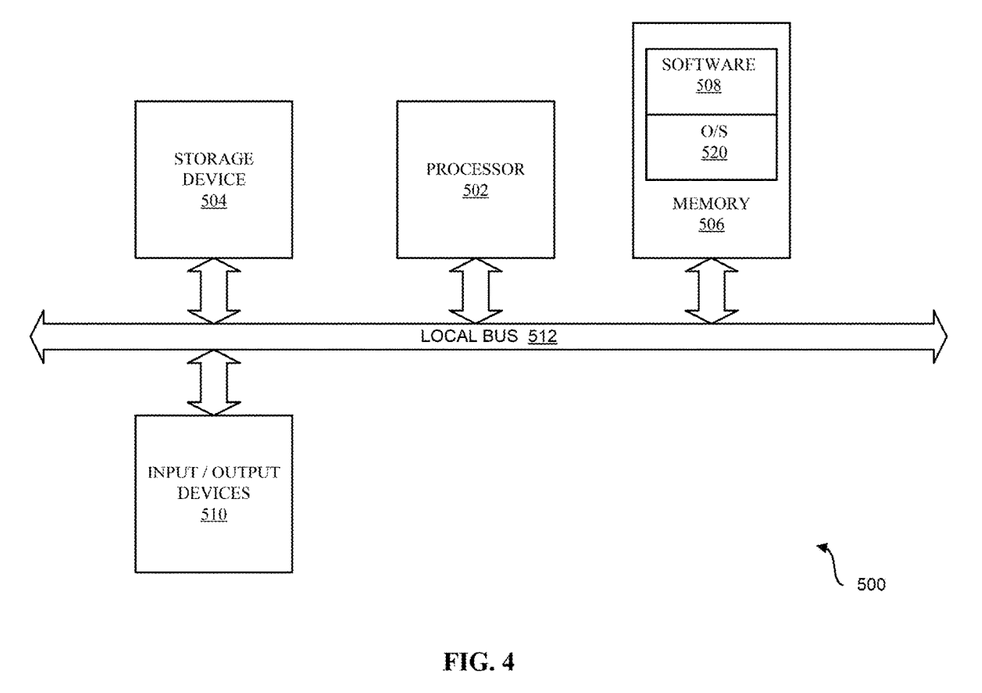
FIG. 4 is a schematic diagram illustrating an example of a system for executing functionality of the present invention.

The present system for executing the functionality described in detail above may be a computer, an example of which is shown in the schematic diagram of FIG. 4. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The above described embodiments may use machine learning to better identify the functionality of a device for determining expected behavior and/or suspicious behavior. By comparison previous techniques may use a single site rule for all devices. For example, a corpus of device data regarding behavior for a large number of functioning devices may be used to detect anomalous activity by another device of the same type. The embodiments may attach a series of facets which make up a fingerprint allowing the embodiments to infer expected behavior for devices. The embodiments may use more than one fingerprint to increase the confidence of a match or identification.

Based on the expected behavior of an identified device, the embodiments may limit access to LAN and WAN resources, for example:
Full access—e.g.—desktop computer
only LAN access
only WAN access
limited LAN access, for example, allowing a Sonos speaker access to a NAS, but not a printer The embodiments may perform further tests on an identified device to test its behavior to identify an imposter, such as a malicious device masquerading as a benign device. For example, it may be possible to determine if a suspect device is masquerading a known type of device by comparing the traffic profile (fingerprint) of the suspect device with known devices of this type.

The embodiments may identify a device model and its firmware for correlation to known vulnerabilities for that model and firmware. This may allow the embodiments to identify devices with vulnerabilities and help users patch those vulnerabilities. For example, a web based user interface may provide a message alerting the user of an update to a LAN attached device. For example, the user interface may indicate one of the devices in the LAN has out of date firmware and then direct the user to a site for instructions how to download and patch the firmware for that device. Similarly, the user interface may be updated to indicate that a device in the LAN is sending/receiving anomalous traffic.

The embodiments may correlate traffic across all devices of the same model and firmware version and identify devices that are behaving in an anomalous manner by performing statistical analysis on that traffic. Specific embodiments may monitor traffic and perform additional analysis, for example, performing a fast Fourier transform (or other frequency domain analysis) to determine periodic behavior of that traffic. This may identify a unique traffic fingerprint for that device that may be used to detect deviations from normal operation for that device, for example, a nest protect smoke alarm.

Embodiments may identify a device type and its capabilities by analyzing the traffic that the device sends and receives. For example by analyzing the uploaded traffic profile, the embodiments may determine whether a device 131-136 has a camera based on the photographic/video data in the traffic to/from the device 131-136. For another example, some devices 131-136 only send encrypted traffic and provide very little information on the network about their type. Traffic analysis may be used to determine the device type. For example the difference between a nest thermostat, a nest camera, and a nest protect may be determined using this technique.

In summary it will be apparent to those skilled in the art that various modifications and variations can be made to the structure of the present invention without departing from the scope or spirit of the invention. In view of the foregoing, it is intended that the present invention cover modifications and variations of this invention.

What is claimed is:

1. A system for a local area network (LAN) (120) in communication with a first network (180), the LAN comprising a LAN router (110) in communication with a plurality of LAN network devices (131-136), the plurality of LAN network devices in communication with a plurality of external network devices (141, 142) in the first network via the LAN router, the system comprising:
a cloud server (160) in communication with the first network, the cloud server further comprising a device attribute database (530) and configured to receive telemetry data and fingerprint data and update the device attribute database; and an agent (115) in communication with the cloud server and the plurality of network devices and the plurality of external network devices via the LAN router, wherein the agent comprises a processor and a memory configured to store non-transitory instructions which, when executed, perform the steps of:

examining LAN router network traffic between one of the plurality of LAN network devices and one of the plurality of external network devices;

executing a scan of the plurality of LAN network devices;

generating the fingerprint data based upon one of the group consisting of the network traffic, the LAN network device scans, and the network traffic and the LAN network device scans;

generating the telemetry data based upon one of the group consisting of the network traffic, the LAN network device scans, and the network traffic and the LAN network device scans; and sending the telemetry data and the fingerprint data to the cloud server, wherein the telemetry or fingerprint data includes at least one of the group consisting of destination data, Dynamic Host Configuration Protocol (DHCP) fingerprint, multicast domain name service (mDNS) data, Hypertext Transfer Protocol (HTTP) data, hostname data, packet size data, and data specific to a web-based service.

2. The system of claim 1, wherein the cloud server is further configured to generate a fingerprint from one of the group consisting of the telemetry data, the fingerprint data, and the telemetry data and the fingerprint data.

3. The system of claim 1, wherein the cloud server is further configured to:

associate the fingerprint with a device profile identifier;

compare the fingerprint to a stored fingerprint of a device type indicated by the device profile identifier; and determine if the fingerprint indicates anomalous behavior for the device type.

4. The system of claim 1, wherein the agent is resident within the LAN router.

5. The system of claim 1, wherein the cloud server is further configured to update a user interface to indicate the update the device attribute database.

6. A server (160) in communication with an agent (115) in a local area network (LAN) (120) via a first network (180) comprising a LAN router (110), the LAN comprising a plurality of LAN network devices (131-136), in communication with a plurality of external network devices (141, 142) in the first network via the LAN router, the server comprising:

a device attribute database (530); and a processor and a memory configured to store non-transitory instructions which, when executed, perform the steps of:

requesting the agent perform a scan of one or more of the plurality of LAN network devices;

receiving telemetry data and fingerprint data from the agent regarding traffic addressed to or transmitted by one of the plurality of LAN network devices;

generating a fingerprint for one of the plurality of LAN network devices from one of the group consisting of the telemetry data, the fingerprint data, and the telemetry data and the fingerprint data; and storing the fingerprint in the device attribute database, wherein the telemetry data includes at least one of the group consisting of destination data, Dynamic Host Configuration Protocol (DHCP) fingerprint, multicast domain name service (mDNS) data, Hypertext Transfer Protocol (HTTP) data, hostname data, packet size data, and data specific to a web-based service, and the fingerprint data excludes data measuring timing of traffic sent to and/or received by any of the plurality of LAN network devices.

7. The server of claim 6, wherein the server is further configured to perform the steps of:

associating the fingerprint with a device profile identifier;

comparing the fingerprint to a stored fingerprint of a device type indicated by the device profile identifier; and determining if the fingerprint indicates anomalous behavior for the device type.

8. A method for monitoring a plurality of LAN network devices (131-136), in a local area network (LAN) (120) comprising a LAN router (110) in communication with a first network (180), the plurality of LAN network devices in communication via the first network with a plurality of external network devices (141, 142) in the first network, the method comprising the steps of:

examining LAN router network traffic between one of the plurality of LAN network devices and one of the plurality of external network devices;

executing a scan of the plurality of LAN network devices;

receiving telemetry data and fingerprint data regarding traffic between one of the plurality of LAN network devices and one of the plurality of external network devices;

generating a fingerprint for one of the plurality of LAN network devices from one of the group consisting of the telemetry data, the fingerprint data, and the telemetry data and the fingerprint data;

storing the fingerprint in the device attribute database; and associating the fingerprint with a device profile identifier, wherein the telemetry data includes at least one of the group consisting of destination data, Dynamic Host Configuration Protocol (DHCP) fingerprint, multicast domain name service (mDNS) data, Hypertext Transfer Protocol (HTTP) data, hostname data, packet size data, and data specific to a web-based service, and the fingerprint data excludes data measuring timing of traffic sent to and/or received by any of the plurality of LAN network devices.

9. The method of claim 8, further comprising the steps of:

comparing the fingerprint to a stored fingerprint of a device type indicated by the device profile identifier; and determining if the fingerprint indicates anomalous behavior for the device type.

10. An agent (115) in a local area network (LAN) (120) comprising a LAN router (110) in communication with a server (160) via a first network (180), the LAN comprising a plurality of LAN network devices (131-136), in communication via the first network with a plurality of external network devices (141, 142), the agent comprising:

a processor and a memory configured to store non-transitory instructions which, when executed, perform the steps of:

examining LAN router network traffic between one of the plurality of LAN network devices and one of the plurality of external network devices;

executing a scan of the plurality of LAN network devices;

generating fingerprint data based upon one of the group consisting of the network traffic, the LAN network device scans, and the network traffic and the LAN network device scans;

generating telemetry data based upon one of the group consisting of the network traffic, the LAN network device scans, and the network traffic and the LAN network device scans; and sending the telemetry data and the fingerprint data to the cloud server, wherein the telemetry data includes at least one of the group consisting of destination data, Dynamic Host Configuration Protocol (DHCP) fingerprint, multicast domain name service (mDNS) data, Hypertext Transfer Protocol (HTTP) data, hostname data, packet size data, and data specific to a web-based service, and the telemetry and fingerprint data excludes data measuring timing of traffic sent to and/or received by any of the plurality of LAN network devices.

11. The agent of claim 10, wherein the agent is resident within the LAN router.

12. A system for a local area network (LAN) (120) in communication with a first network (180), the LAN comprising a LAN router 110 in communication with a plurality of LAN network devices (131-136), the plurality of LAN network devices in communication via the first network with a plurality of external network devices (141, 142), the system comprising:

a cloud server (160) in communication with the first network, the cloud server further comprising a device attribute database (530) and configured to receive telemetry data and fingerprint data and update the device attribute database; and an agent (115) in communication with the cloud server and the plurality of network devices and the plurality of external network devices via the LAN router, wherein the agent comprises a processor and a memory configured to store non-transitory instructions which, when executed, perform the steps of:

examining LAN router network traffic between a first device of the plurality of LAN network devices and a second device of the plurality of LAN network devices;

executing a scan of the plurality of LAN network devices;

generating the fingerprint data based upon one of the group consisting of the network traffic, the LAN network device scans, and the network traffic and the LAN network device scans;

generating the telemetry data based upon one of the group consisting of the network traffic, the LAN network device scans, and the network traffic and the LAN network device scans; and sending the telemetry data and the fingerprint data to the cloud server.

13. The system of claim 12, wherein the cloud server is further configured to generate a fingerprint from one of the group consisting of the telemetry data, the fingerprint data, and the telemetry data and the fingerprint data.

14. The system of claim 12, wherein the cloud server is further configured to:

associate the fingerprint with a device profile identifier;

compare the fingerprint to a stored fingerprint of a device type indicated by the device profile identifier; and determine if the fingerprint indicates anomalous behavior for the device type.

* * * * *